T. E. PATTERSON.
SLEIGH ATTACHMENT FOR MOTOR VEHICLES.
APPLICATION FILED MAY 17, 1915.
1,247,571.
Patented Nov. 20, 1917.
2 SHEETS—SHEET 1.
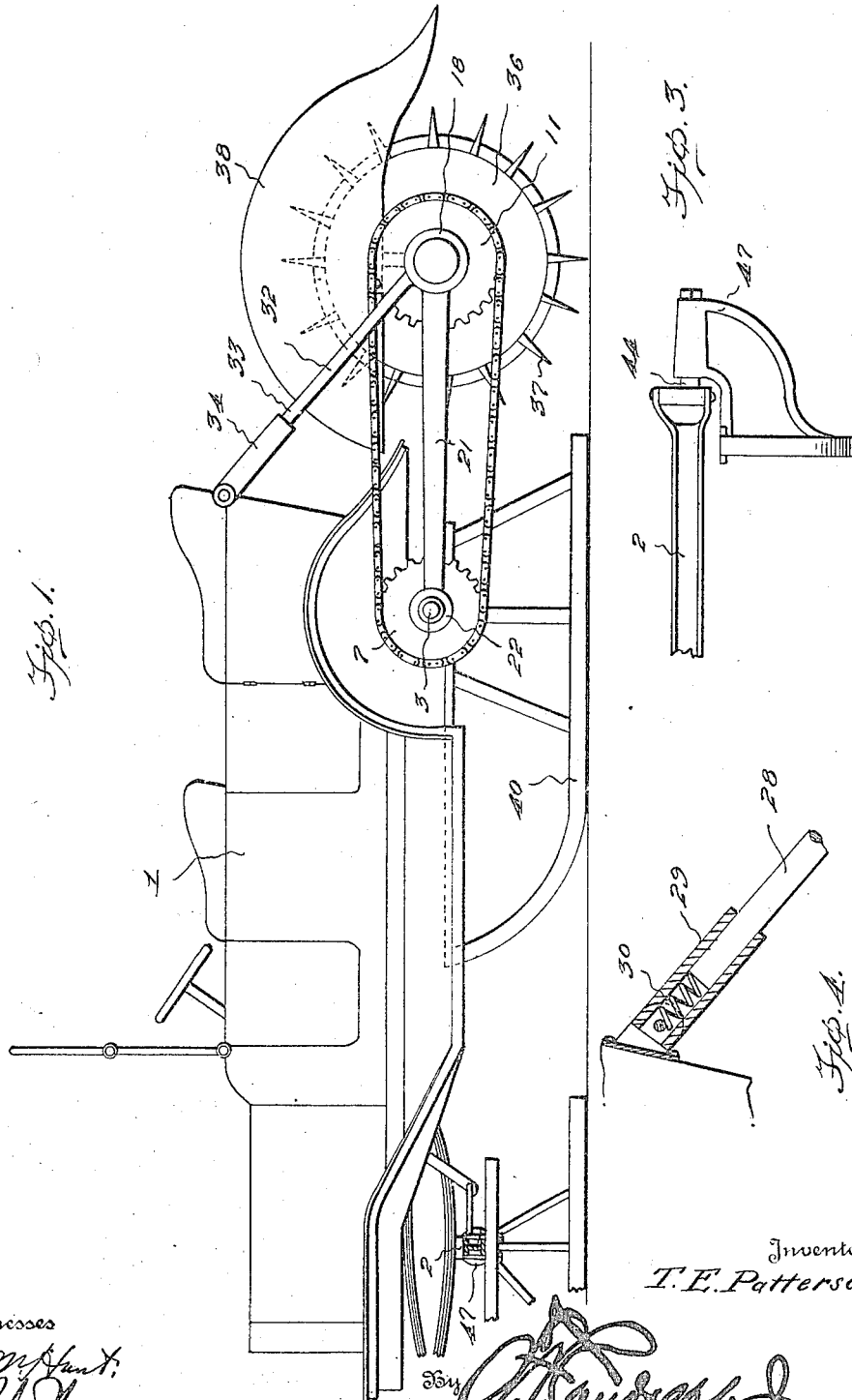

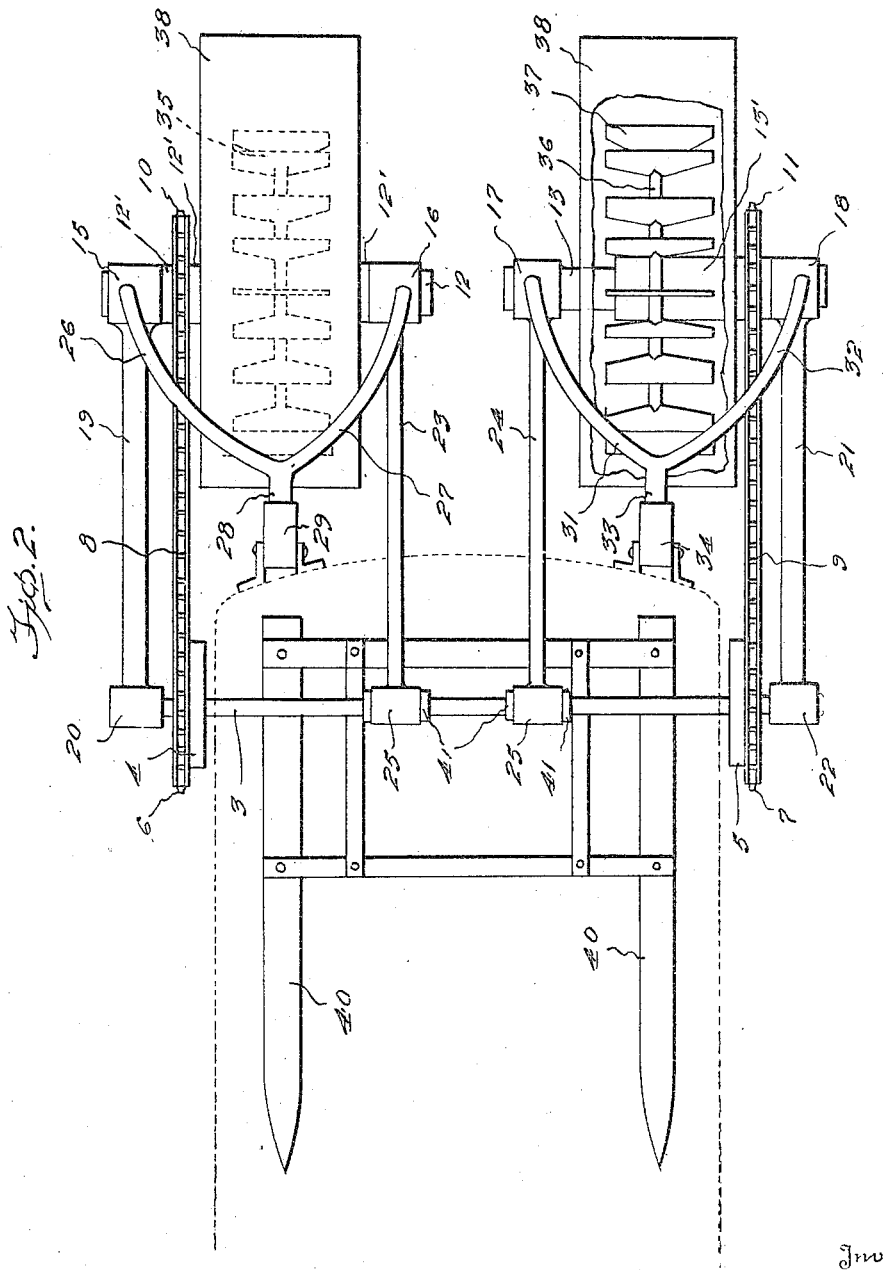

UNITED STATES PATENT OFFICE.

THOMAS E. PATTERSON, OF ATHABASCA, ALBERTA, CANADA.

SLEIGH ATTACHMENT FOR MOTOR-VEHICLES.

1,247,571. Specification of Letters Patent. Patented Nov. 20, 1917.

Application filed May 17, 1915. Serial No. 28,802.

*To all whom it may concern:*

Be it known that I, THOMAS E. PATTERSON, subject of the King of Great Britain, citizen of Canada, residing at Athabasca, in the Province of Alberta and Dominion of Canada, have invented certain new and useful Improvements in Sleigh Attachments for Motor-Vehicles; and I do hereby declare the following to be a full, clear, and exact description of the invention, such as will enable others skilled in the art to which it appertains to make and use the same.

This invention relates to sleigh or sled attachments for motor vehicles, such as automobiles or the like, and the primary object of the invention is to provide means whereby the ordinary wheels of a motor vehicle may be easily and quickly replaced by sled or sleigh runners, for converting the motor vehicle into a motor sleigh.

Another object of this invention is to provide a novel form of propelling means which is applicable for attachment to the drive axle of the vehicle, for being propelled thereby, for propelling the motor sleigh over the snow, ice or the like.

A still further object of this invention is to provide means for yieldably mounting the propelling wheels or means so as to permit of a cushioned action thereof.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the improved sleigh attachment for motor vehicles, showing a part of the front runners broken away, Fig. 2 is a top plan view of the rear runners and propelling structure, Fig. 3 is a fragmentary front view of one of the front runners of the sleigh attachment, and Fig. 4 is a fragmentary sectional view through the cushioning means, for yieldably supporting the propelling structure of the sleigh.

Referring more particularly to the drawings, 1 designates the body of an automobile, or motor vehicle, which has front and rear axles 2 and 3. In Fig. 2 of the drawings, the rear axle 3 is illustrated as the power or propelling axle of the motor vehicle, and it is operatively connected to the motor or prime mover of the vehicle in any suitable manner, (not shown). The rear axle 3 of the motor vehicle has brake drums 4 and 5 of the ordinary construction mounted thereupon, and sprockets 6 and 7 mounted upon the axle outwardly of the brake drums, as is clearly shown in Fig. 2 of the drawings. The sprocket chains 8 and 9 pass about the sprockets 6 and 7, and about sprockets 10 and 11 which latter are carried by the hubs 12' and 13' of wheels 35 and 36. Stub axles 12 and 13 are rotatably supported by bearing or journal boxes 15, 16, 17 and 18. The journal box 15 is formed upon the rear end of a bracing arm 19, which has a bearing 20 formed upon its forward end. The bearing 20 is mounted upon the outer end of the axle 3. The journal box 18 is formed upon the rear end of a bracing arm 21, which has a bearing 22 formed upon its forward end, which rotatably receives one end of the axle 3. The journal boxes 16 and 17 are formed upon the rear ends of bracing arms 23 and 24, which are positioned intermediate of the bracket arms 19 and 21 and have bearings 25 formed upon their inner ends, which encompass or receive the axle 3 intermediate of the bearings 20 and 22.

The bearing or journal boxes 15 and 16 are connected by arcuate arms 26 and 27, which converge and are connected to or formed integrally with a rod 28, which extends upwardly at an incline from the stub axle 12 and has its upper end slidably seated in a sleeve 29, which is pivoted to the rear end of the body 1 of the motor vehicle. A cushioning spiral spring 30 is mounted in the sleeve 29 and bears against the upper end of the rod 28 for cushionably supporting the same, so as to permit of a limited yieldable movement of the rod, and consequently of the stub axle 12.

The bearing or boxes 17 and 18 are connected by arcuate arms 31 and 32, which extend upwardly at an incline therefrom, and converge, being formed upon the rod 33, which is seated in a sleeve 34. The sleeve 34 is also pivoted to the rear end of the body 1 of the motor vehicle and has a cushioning spring mounted therein.

The stub axles 12 and 13 have the wheels 35 and 36 mounted thereon, which have a plurality of radially extending blades 37 secured to the peripheries thereof. The outer edges of the blades may be sharpened, and are straight as shown in Figs. 1 and 2 of the drawings, but may be of any desired shape or curvature.

Snow guards 38 are positioned over the spur wheels 36, so as to prevent the snow or ice from flying upwardly and striking the person seated in the vehicle body 1.

Runners 40 are connected to the rear axle 3 or the casing which encompasses the rear axle, in any suitable manner, such as by collars 41, in place of the ordinary wheels.

The spindles 44 of the front axle 2 of the vehicle have individual runners 46 mounted thereon, which have hub sections 47 for encompassing the spindles 44.

The spur wheels 35 and 36 will be rotated by the rotation of the power axle of the motor vehicle, which will cause the blades 37 to be forced into the snow or ice and propel the vehicle over the same.

If it is so desired, it is to be understood that a single one of the spur wheels, together with supporting structure heretofore described, may be applied to motorcycles, or the like without departing from the spirit of this invention.

From the foregoing description taken in connection with the accompanying drawings the advantages of construction and of the method of operation of the improved sleigh attachment for motor vehicles will be readily apparent to those skilled in the art to which this invention appertains and, while in the foregoing description, the principle of the operation of this invention has been described, together with various features of construction, it is to be understood that certain minor features of construction, combination and arrangement of parts may be altered to suit practical conditions provided such alterations are comprehended within the scope of what is claimed.

What is claimed is:—

1. The combination with the rear axle of a motor vehicle, of runners secured to the rear axle, arms journaled to and extending rearwardly from said axle, journal boxes carried by the rear ends of said arms, a stub axle carried by said boxes, a spur wheel rotatably mounted upon said stub axle and having a plurality of radially extending blades, means operatively connecting said spur wheel and said rear axle for rotating said spur wheel upon the rotation of said rear axle, a Y-shaped brace secured by the ends of its arms to each of the boxes on opposite sides of the spur wheel, and means for cushioningly supporting the stem of said brace and permitting of a limited movement of said spur wheel.

2. The combination with a motor vehicle including a rear power axle, of runners secured to the axle, a pair of arms movably connected to the axle, a stub shaft journaled to the arms, a spur wheel rotatably mounted on the stub shaft, means rotating the spur wheel by the axle, a Y-shaped brace having its arm portions secured to the arms, a cylindrical member pivoted to the vehicle and slidably receiving the stem portion of the Y-shaped brace, and a spring located in said cylindrical member for urging the spur wheel into engagement with the ground.

In testimony whereof I affix my signature in presence of two witnesses.

THOMAS E. PATTERSON.

Witnesses:
EDITH MAY JARVIS,
MABEL MAUD PATTERSON.

Copies of this patent may be obtained for five cents each, by addressing the "Commissioner of Patents, Washington, D. C."